United States Patent
Yoshioka et al.

(10) Patent No.: US 12,438,986 B2
(45) Date of Patent: Oct. 7, 2025

(54) CONGESTION CONTROL METHOD, CONGESTION CONTROL DEVICE, AND CONGESTION CONTROL PROGRAM

(71) Applicant: NTT, Inc., Tokyo (JP)

(72) Inventors: Masafumi Yoshioka, Musashino (JP); Fumiaki Nagase, Musashino (JP); Toshifumi Miyagi, Musashino (JP)

(73) Assignee: NTT, Inc., Tokyo (JP)

( * ) Notice: Subject to any disclaimer, the term of this patent is extended or adjusted under 35 U.S.C. 154(b) by 188 days.

(21) Appl. No.: 18/036,465

(22) PCT Filed: Nov. 11, 2020

(86) PCT No.: PCT/JP2020/042152
§ 371 (c)(1),
(2) Date: May 11, 2023

(87) PCT Pub. No.: WO2022/102033
PCT Pub. Date: May 19, 2022

(65) Prior Publication Data
US 2023/0300255 A1    Sep. 21, 2023

(51) Int. Cl.
*H04M 7/00* (2006.01)
*H04L 1/00* (2006.01)
(Continued)

(52) U.S. Cl.
CPC ........ *H04M 7/0084* (2013.01); *H04L 1/0061* (2013.01); *H04L 47/12* (2013.01); *H04L 47/24* (2013.01); *H04L 47/28* (2013.01)

(58) Field of Classification Search
CPC .................... H04M 7/0084; H04L 1/0061
See application file for complete search history.

(56) References Cited

U.S. PATENT DOCUMENTS 6,678,258 B1 * 1/2004 Capurka ............. H04W 84/025
                                                    370/328
6,779,030 B1 * 8/2004 Dugan ................. H04Q 3/0037
                                                    379/221.08
(Continued)

FOREIGN PATENT DOCUMENTS

JP        2019193053         10/2019

OTHER PUBLICATIONS

NTT, "Opinion on congestion countermeasures by "introduction of communication time limit"," Ministry of Internal Affairs and Communications, Information and Communications Council, Information and Communications Technology Subcommittee, IP Network Equipment Committee (19th), Communication Security Working Group (5th) Joint Meeting, Dec. 12, 2011, 9 pages (with English Translation).

(Continued)

*Primary Examiner* — Melanie Jagannathan
(74) *Attorney, Agent, or Firm* — Fish & Richardson P.C.

(57) ABSTRACT

A congestion control method in an IP telephone system includes processing of acquiring the number of simultaneous calls on one line shared by a plurality of IP telephones, processing of acquiring lengths of call duration of respective calls, and communication parameter setting processing of setting communication parameters that contribute to communication quality of respective calls on the basis of the number of simultaneous calls and the call duration. The call duration of the first call is longer than the call duration of the second call. The communication parameter setting processing includes processing of setting communication parameters such that the communication quality of the first call is worse than the communication quality of the second call in a case where the number of simultaneous calls exceeds a threshold value.

7 Claims, 12 Drawing Sheets

(51) Int. Cl.
*H04L 47/12* (2022.01)
*H04L 47/24* (2022.01)
*H04L 47/28* (2022.01)

(56) References Cited

U.S. PATENT DOCUMENTS

| | | | | |
|---|---|---|---|---|
| 7,167,451 | B1* | 1/2007 | Oran | H04L 65/1101 |
| | | | | 370/252 |
| 7,457,287 | B1* | 11/2008 | Shaffer | H04L 47/70 |
| | | | | 370/389 |
| 8,463,909 | B1* | 6/2013 | Szabo | H04L 67/564 |
| | | | | 370/413 |
| 8,503,313 | B1* | 8/2013 | Lang | H04L 65/80 |
| | | | | 379/139 |
| 10,469,661 | B1* | 11/2019 | Xuereb | H04M 3/5158 |
| 11,337,108 | B2* | 5/2022 | John | H04W 76/10 |
| 2004/0156391 | A1* | 8/2004 | Bushnell | H04Q 3/62 |
| | | | | 370/468 |
| 2007/0087739 | A1* | 4/2007 | Jung | H04W 84/14 |
| | | | | 455/422.1 |
| 2007/0274284 | A1* | 11/2007 | Dendukuri | H04L 43/00 |
| | | | | 370/351 |
| 2009/0122705 | A1* | 5/2009 | DeVal | H04L 47/10 |
| | | | | 370/235 |
| 2009/0129560 | A1* | 5/2009 | Bowden | H04Q 3/0091 |
| | | | | 379/32.01 |
| 2010/0070647 | A1* | 3/2010 | Irino | H04L 43/026 |
| | | | | 709/234 |
| 2012/0208495 | A1* | 8/2012 | Lawson | H04L 12/1446 |
| | | | | 455/406 |
| 2012/0259722 | A1* | 10/2012 | Mikurak | G06Q 30/0261 |
| | | | | 705/26.1 |
| 2012/0281536 | A1* | 11/2012 | Gell | H04W 28/06 |
| | | | | 370/235 |
| 2015/0009874 | A1* | 1/2015 | Edara | H04W 72/1268 |
| | | | | 370/311 |
| 2015/0331729 | A1* | 11/2015 | Kurokawa | H04L 67/01 |
| | | | | 709/203 |
| 2016/0057284 | A1* | 2/2016 | Nagpal | H04M 3/5232 |
| | | | | 379/266.07 |
| 2016/0373575 | A1* | 12/2016 | Presta | H04M 3/367 |
| 2016/0380878 | A1* | 12/2016 | Bugenhagen | H04L 45/00 |
| | | | | 370/238 |
| 2020/0213448 | A1* | 7/2020 | Newman | H04L 65/1013 |
| 2021/0029005 | A1 | 1/2021 | Kidokoro et al. | |
| 2022/0006900 | A1* | 1/2022 | Baror | H04M 3/4283 |
| 2023/0215429 | A1* | 7/2023 | Lembersky | G10L 15/04 |
| | | | | 704/251 |

OTHER PUBLICATIONS

Suzuki et al., "Performance Analysis and Traffic Design of MCA Fleet Dispatch Communication System," Transactions of the Institute of Electronics, Information and Communication Engineers B-II, 1997, J80-B-II(1):44-53.

Tanabe et al., "Threshold Relaxation and Holding Time Limitation Method for Accepting More General Calls under Emergency Trunk Reservation," IEICE Transaction on Fundamentals of Electronics, Communications and Computer Sciences, 2016, E99-A(8):1518-1528.

* cited by examiner

Fig. 12

<200: CALL MANAGEMENT TABLE>

| CALL ID | TRANSMISSION SOURCE ADDRESS/ PORT NUMBER | DESTINATION ADDRESS/ PORT NUMBER | CALL START TIME |
|---|---|---|---|
| C1 | GA.GB.GC.GD/1000 | TA.TB.TC.TD/5000 | YY/DD/HH:MM:SS |
| C2 | GE.GF.GG.GH/1200 | TE.TF.TG.TH/5200 | YY/DD/HH:MM:SS |
| C3 | GI.GJ.GK.GL/1400 | TI.TJ.TK.TL/5400 | YY/DD/HH:MM:SS |
| ... | ... | ... | ... |

CONGESTION CONTROL METHOD, CONGESTION CONTROL DEVICE, AND CONGESTION CONTROL PROGRAM

CROSS-REFERENCE TO RELATED APPLICATIONS

This application is a National Stage application under 35 U.S.C. § 371 of International Application No. PCT/JP2020/042152, having an International Filing Date of Nov. 11, 2020, the disclosure of which is considered part of the disclosure of this application, and is incorporated by reference in its entirety into this application.

TECHNICAL FIELD

The present invention relates to technology for controlling congestion in an Internet protocol (IP) telephone system.

BACKGROUND ART

When disaster happens, communication traffic greatly increases, and user communication is difficult to be secured. Furthermore, important communication of police, fire departments, and the like are also affected.

Therefore, communication carriers take measures against congestion of communication traffic as necessary. For example, in order to reduce the communication traffic, limiting call duration to minimum call duration for safety confirmation and the like is efficient. Therefore, there is a method for restricting call duration by calls that are established communication between specific individuals being forcibly disconnected in general telephones (see Non Patent Literature 1 and 2). Furthermore, in multi-channel access (MCA) radio, an operation of restricting one-time call duration is implemented (see Non Patent Literature 3).

On the other hand, "IP telephones" using data communication (packet communication) have also been widespread (see Patent Literature 1). Unlike a line switching type general telephone that occupies a line during a call, in an IP telephone, a line is occupied only when packets are transmitted and received. Therefore, in an IP telephone, calls of a plurality of IP telephones can share one line. Forcible disconnection and restriction of call duration are not performed even in a call congestion state. Instead, packets that exceed the line capacity of one line shared by a plurality of IP telephones are discarded. Although the voice quality is deteriorated due to packet discard, IP telephones tend to be easily connected even in a congestion state. Therefore, IP telephones are regarded as promising communication means in the event of disaster.

CITATION LIST

Patent Literature

Patent Literature 1: JP 2019-193053 A

Non Patent Literature

Non Patent Literature 1: K. Tanabe, S. Miyata, K. Baba and K. Yamaoka, "Threshold Relaxation and Holding Time Limitation Method for Accepting More General Calls under Emergency Trunk Reservation", IEICE Transaction on Fundamentals of Electronics, Communications and Computer Sciences, pp. 1518-1528, August 2016.

Non Patent Literature 2: "Opinions regarding measures against congestion brought about by "introduction of communication time limit", submitted by Nippon Telegraph and Telephone Co., Ltd., the Ministry of Internal Affairs and Communications, Information and Communication Council, Sectional Committee on Information and Communication Technology, IP Network Equipment Committee (19th), Communication Secure Crew, joint meeting (5th) (Dec. 12, 2011)

Non Patent Literature 3: Kozo Suzuki, Tomio Yoshida, and Yasushi Mizutani, "Performance Analysis and Traffic Design of MCA Fleet Dispatch Communication System", Transactions on Communications B-II Vol., J80-B-II No. 1 pp. 44-53, January 1997

SUMMARY OF INVENTION

Technical Problem

When an IP telephone line is congested, packets that exceed the line capacity of one line shared by a plurality of IP telephones are discarded. According to conventional IP telephones, packets of all calls using the line are uniformly (evenly) discarded. Therefore, communication quality (voice quality) of all calls is uniformly deteriorated. As a result, the satisfaction levels of all users are decreased.

One object of the present invention is to provide technology capable of preventing uniform deterioration of communication quality of all calls sharing one certain line when an IP telephone line is congested.

Solution to Problem

A first aspect relates to a congestion control method in an IP telephone system.

The congestion control method includes processing of acquiring the number of simultaneous calls on one line shared by a plurality of IP telephones, processing of acquiring lengths of call duration of respective calls, and communication parameter setting processing of setting communication parameters that contribute to communication quality of respective calls and are different from a packet discard ratio on the basis of the number of simultaneous calls and the call duration.

The call duration of the first call is longer than the call duration of the second call.

The communication parameter setting processing includes processing of setting communication parameters such that the communication quality of the first call is worse than the communication quality of the second call in a case where the number of simultaneous calls exceeds a threshold value.

A second aspect relates to a congestion control program. The congestion control program is performed by a computer and causes the computer to perform the above congestion control method. The congestion control program may be recorded in a computer-readable recording medium.

The congestion control program may be provided via a network.

A third aspect relates to a congestion control device in the IP telephone system.

The congestion control device includes an information processing device.

The information processing device is configured to perform
 processing of acquiring the number of simultaneous calls on one line shared by a plurality of IP telephones,
 processing of acquiring lengths of call duration of respective calls, and
 communication parameter setting processing of setting communication parameters that contribute to communication quality of respective calls and are different from a packet discard ratio on the basis of the number of simultaneous calls and the call duration.

The call duration of the first call is longer than the call duration of the second call.

The information processing device sets the communication parameters such that the communication quality of the first call is worse than the communication quality of the second call in a case where the number of simultaneous calls exceeds a threshold value.

Advantageous Effects of Invention

According to the present invention, communication parameters are set such that the communication quality of the first call having long call duration is worse than the communication quality of the second call having short call duration in a case where the number of simultaneous calls exceeds a threshold value. That is, the communication quality of a call having short call duration is set to be relatively high, and the communication quality of a call having long call duration is set to be relatively low. For a call having short call duration, deterioration of communication quality is prevented. As a result, uniform deterioration in communication quality (voice quality) of all calls can be prevented. As a result, the satisfaction levels of users are improved as a whole.

When voice quality decreases, a user is expected to feel like ending a call. That is, as call duration is longer, the possibility that a user ends a call is higher. Ending a call having long call duration releases a line resource, and improves voice quality of a call of another user. Furthermore, a call of a new user is easier to be accepted, and a call loss probability is decreased.

BRIEF DESCRIPTION OF DRAWINGS

FIG. 12 is a conceptual diagram illustrating an example of a call management table according to the embodiment of the present invention.

DESCRIPTION OF EMBODIMENTS

Embodiments of the present invention will be described with reference to the accompanying drawings.

1. IP Telephone System

Figure 1:
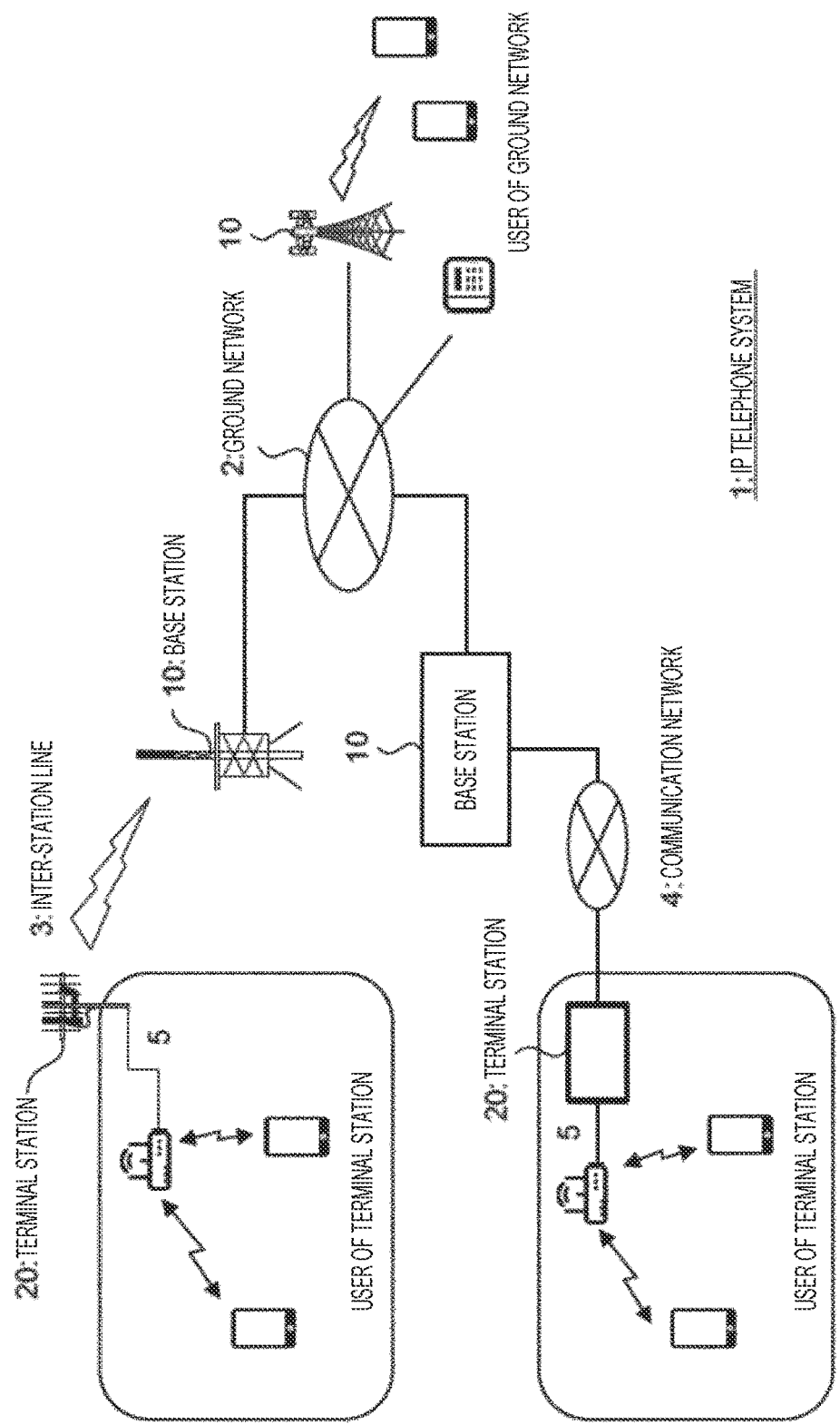
FIG. 1 is a schematic diagram illustrating a configuration example of an IP telephone system according to an embodiment of the present invention.

FIG. 1 is a schematic diagram illustrating a configuration example of an IP telephone system 1 according to the present embodiment. The IP telephone system 1 includes base stations 10 and terminal stations 20. The base stations 10 are connected to a ground network 2. The terminal stations 20 are installed, for example, in organizations related to disaster prevention, organizations related to living, shelters, or the like in a community. The base stations 10 and the terminal stations 20 are connected to each other via a wireless inter-station line 3 or a wired communication network 4. The base stations 10 and the terminal stations 20 communicate with each other via the inter-station line 3 or the communication network 4. The terminal stations 20 are connected to terminal station networks 5. In such an IP telephone system 1, for example, a user of the ground network 2 and a user of a terminal station 20 make a call by IP telephones. One line of the inter-station line 3 or the communication network 4 is shared by a plurality of IP telephones (calls).

In IP telephones, since real-time property is required, user datagram protocol/Internet protocol (UDP/IP) is used. Unlike transmission control protocol (TCP), retransmission control is not performed in UDP/IP.

Therefore, in a case where call traffic equal to or higher than the line capacity of an IP telephone line is generated, packets that exceed the line capacity are discarded. For example, in the IP telephone system 1 illustrated in FIG. 1, in a case where call traffic equal to or higher than the line capacity of one line of the inter-station line 3 or the communication network 4 between a base station 10 and a terminal station 20 is generated, packets that exceed the line capacity are discarded.

Figure 2:
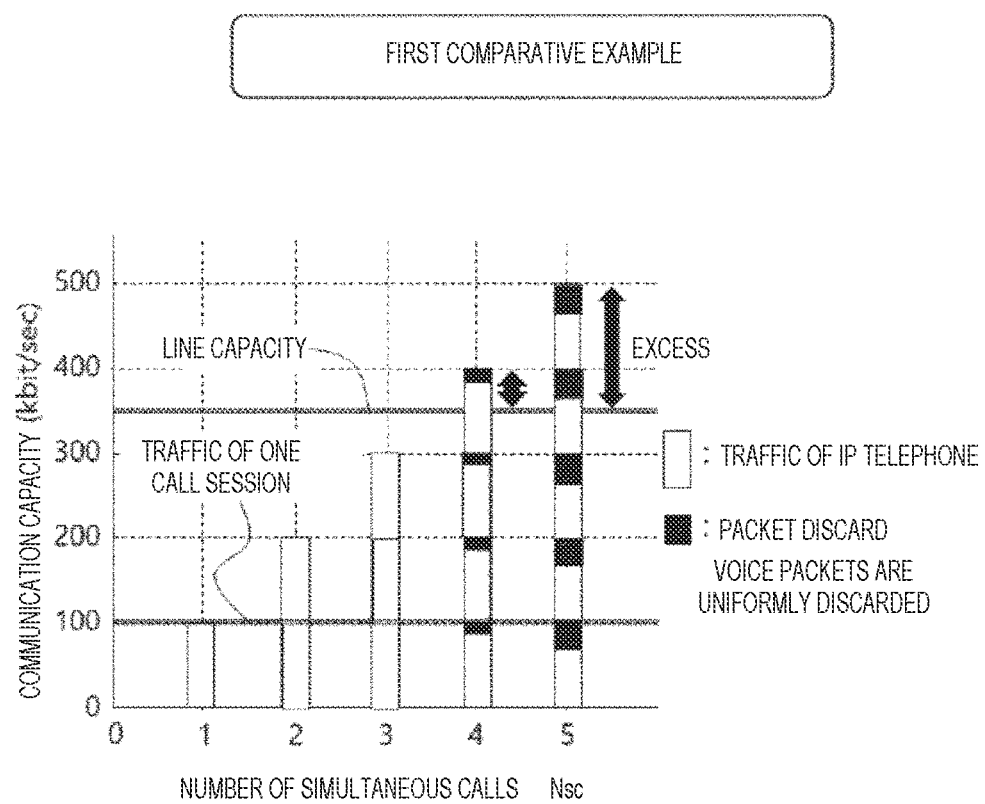
FIG. 2 is a conceptual diagram for describing packet discard in a first comparative example.

FIG. 2 illustrates, as a first comparative example, relation between the number of simultaneous calls Nsc and packet discard in a case of conventional IP telephones. The number of simultaneous calls Nsc is the number of calls simultaneously using one certain line. For example, the number of simultaneous calls Nsc is the number of calls that are simultaneously establishing sessions at certain time on one line of the inter-station line 3 or the communication network 4. In a case where the number of simultaneous calls Nsc increases and call traffic equal to or higher than the line capacity is generated, packets of all calls are uniformly (evenly) discarded. The packet discard ratio in this case is expressed by following Equation (1).

$$\text{packet discard ratio} = 1 - (\text{line capacity}/\text{all-call traffic}) \quad \text{Equation (1)}$$

For example, it is assumed that the line capacity is 340 kbit/s and traffic of 100 kbit/s is generated per call. In a case where the number of simultaneous calls Nsc is 3 or less, the packet discard ratio is 0. In a case where the number of simultaneous calls Nsc is 4, the packet discard ratio is 15%. Since packets of all calls are uniformly discarded, the communication quality (voice quality) of all the calls is uniformly deteriorated. As a result, the satisfaction levels of all users are decreased.

Therefore, the present embodiment provides technology capable of preventing uniform deterioration of communication quality (voice quality) of all calls when an IP telephone line is congested.

2. Congestion Control Device

The IP telephone system 1 according to the present embodiment dynamically controls the communication quality of respective calls when an IP telephone line is congested. For this purpose, the IP telephone system 1 includes congestion control devices 100. The congestion control devices 100 are disposed in association with stations that control communication of IP telephones (example: base stations 10 and terminal stations 20).

Figure 3:
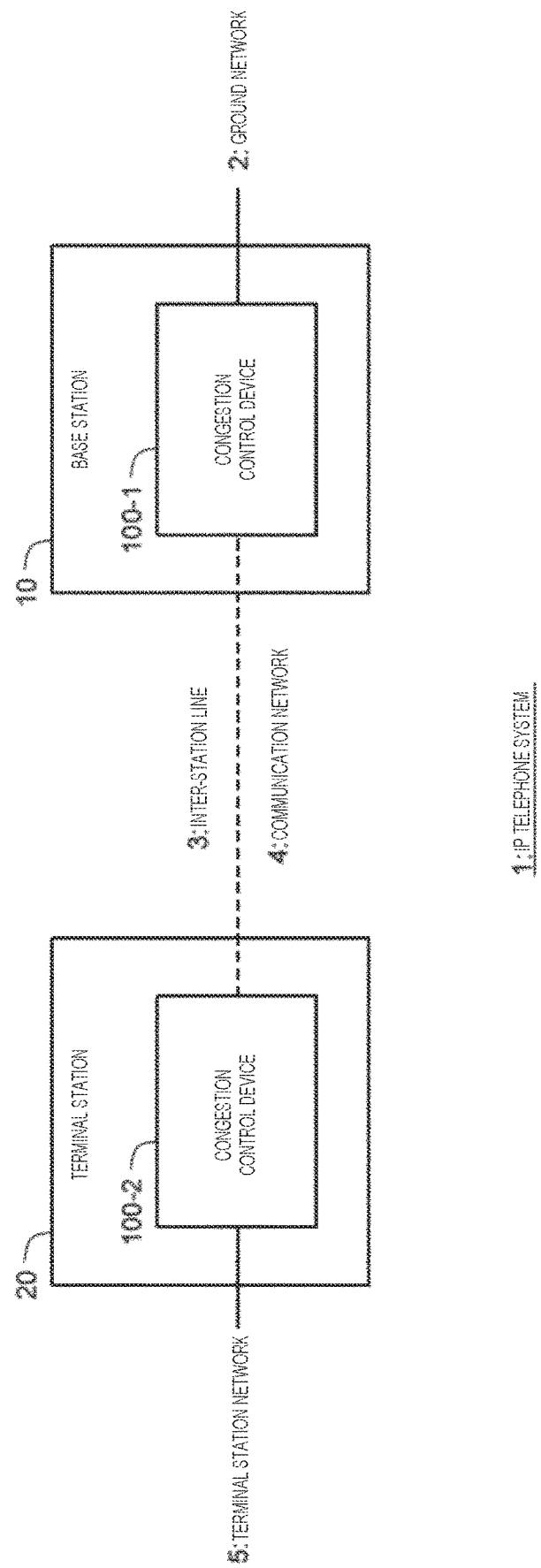
FIG. 3 is a block diagram illustrating an example of disposition of congestion control devices according to the embodiment of the present invention.

FIG. 3 is a block diagram illustrating an example of disposition of the congestion control devices 100. In the example illustrated in FIG. 3, a congestion control device 100-1 is disposed in a base station 10, and a congestion control device 100-2 is disposed in a terminal station 20. Each of congestion control devices 100-1 and 100-2 controls the communication quality of respective calls on an IP telephone line (inter-station line 3 or communication network 4) between the base station 10 and the terminal station 20.

Hereinafter, characteristic processing by a congestion control device 100 according to the present embodiment will be described.

2-1. Setting of Communication Parameters in Consideration of Priority

The congestion control device 100 according to the present embodiment has a function of dynamically controlling the communication quality of respective calls. In order to dynamically control the communication quality of respective calls, the congestion control device 100 dynamically sets "communication parameters CP" for the respective calls. The communication parameters CP are parameters that contribute to the communication quality of the respective calls. Note that the communication quality can be controlled by the packet discard ratio being actively controlled, but in the present embodiment, communication parameters CP other than the packet discard ratio are considered.

An example of the communication parameters CP is a modulation method applied to communication data. The modulation method is not particularly specified, and examples thereof include BPSK, QPSK, 16QAM, 64QAM, 128QAM, and 256QAM. The modulation method may also be referred to as a modulation order.

Another example of the communication parameters CP is an error correction code applied to communication data (error correction method). The error correction code is not particularly specified, and examples thereof include low-density parity-check (LDPC) codes having different coding rates (for example, coding rates=1/2, 2/3, 3/4, and 5/6).

The communication parameters CP may include both a modulation method and an error correction code.

In a case where the communication parameters CP change, the communication quality such as packet error rates (PERs) changes. Therefore, the communication quality of respective calls can be dynamically controlled by the communication parameters CP related to the respective calls being changed. Processing of setting the communication parameters CP is hereinafter referred to as "communication parameter setting processing".

The communication parameter setting processing during congestion will be described below. The congestion control device 100 determines whether the number of simultaneous calls Nsc exceeds a threshold value Nsc_th. The threshold value Nsc_th is the number of simultaneous calls Nsc with which at least predetermined communication quality can be obtained in all calls. For example, the threshold value Nsc_th is the maximum number of simultaneous calls Nsc at which the packet discard ratio expressed by above Equation (1) is 0 or less. In other words, the threshold value Nsc_th is a maximum integer that does not exceed "line capacity/one-call traffic". In this case, when the line state (line capacity) changes, the threshold value Nsc_th also changes. As another example, the threshold value Nsc_th may be a predetermined constant number.

In a case where the number of simultaneous calls Nsc exceeds the threshold value Nsc_th, the congestion control device 100 performs the communication parameter setting processing in order to dynamically control the communication quality of the respective calls. Therefore, the congestion control device 100 sets priority for the respective calls. Then, the congestion control device 100 sets the communication parameters CP related to the respective calls according to the priority, and dynamically controls the communication quality of the respective calls.

Figure 4:
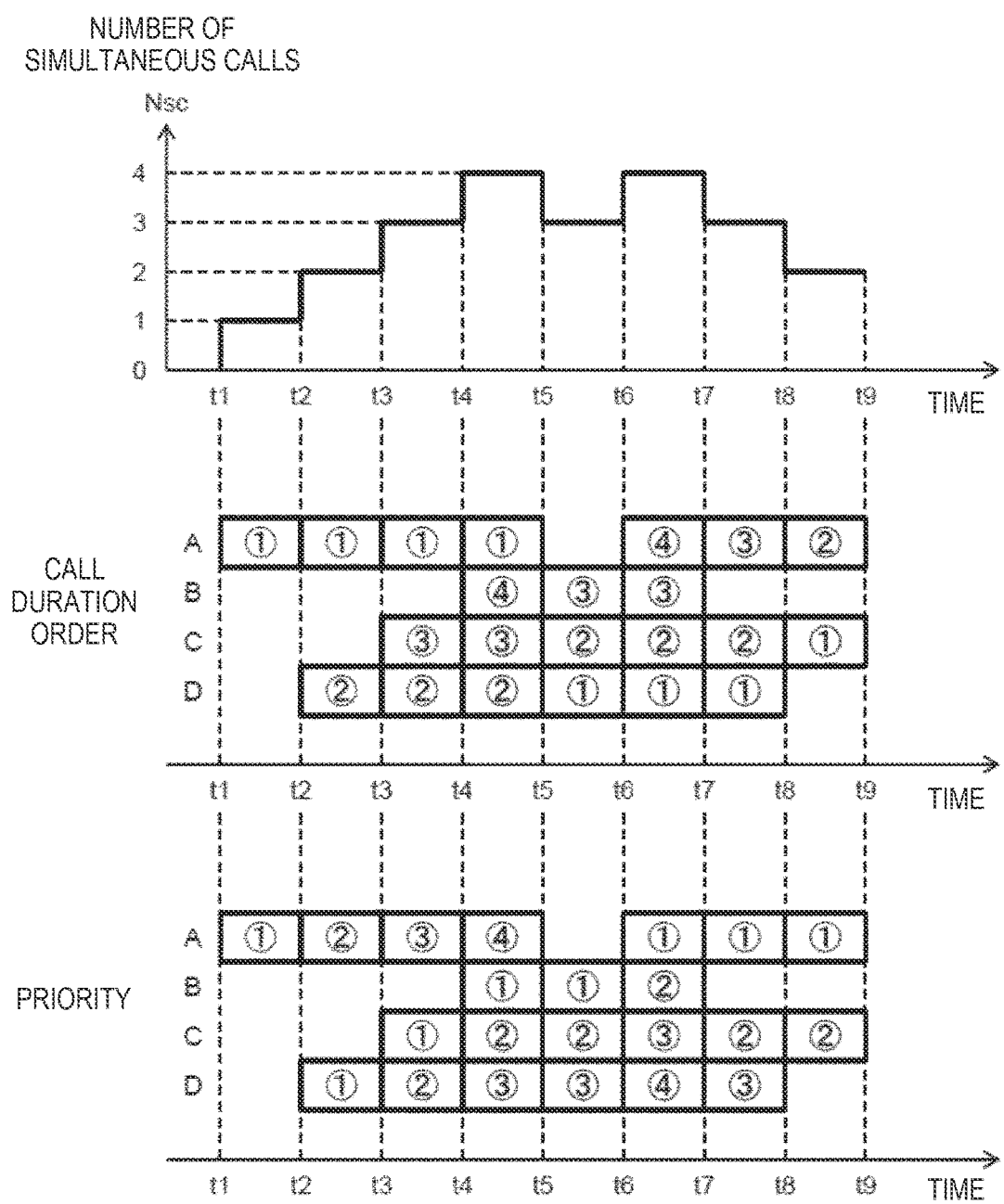
FIG. 4 is a conceptual diagram for describing an example of priority in the embodiment of the present invention.

FIG. 4 is a conceptual diagram for describing an example of the priority. FIG. 4 illustrates transitions of the call states of a plurality of respective users A, B, C, and D and the number of simultaneous calls Nsc. At time t1, a user A starts a call (Nsc=1). At time t2, a user D starts a call (Nsc=2). At time t3, a user C starts a call (Nsc=3). At time t4, a user B starts a call (Nsc=4). At time t5, the user A ends the call (Nsc=3). At time t6, the user A starts a call (Nsc=4). At time t7, the user B ends the call (Nsc=3). At time t8, the user D ends the call.

Circled numbers in the middle part of FIG. 4 represent call duration orders of the respective calls (respective users). The smaller the circled number, the higher the call duration order, that is, the longer the call duration. The larger the circled number, the lower the call duration order, that is, the shorter the call duration.

Circled numbers in the lower part of FIG. 4 represent the priority of the respective calls (respective users). The smaller the circled number, the higher the priority. More specifically, the priority is set higher as the call duration is shorter, and the priority is set lower as the call duration is longer.

Figure 5:
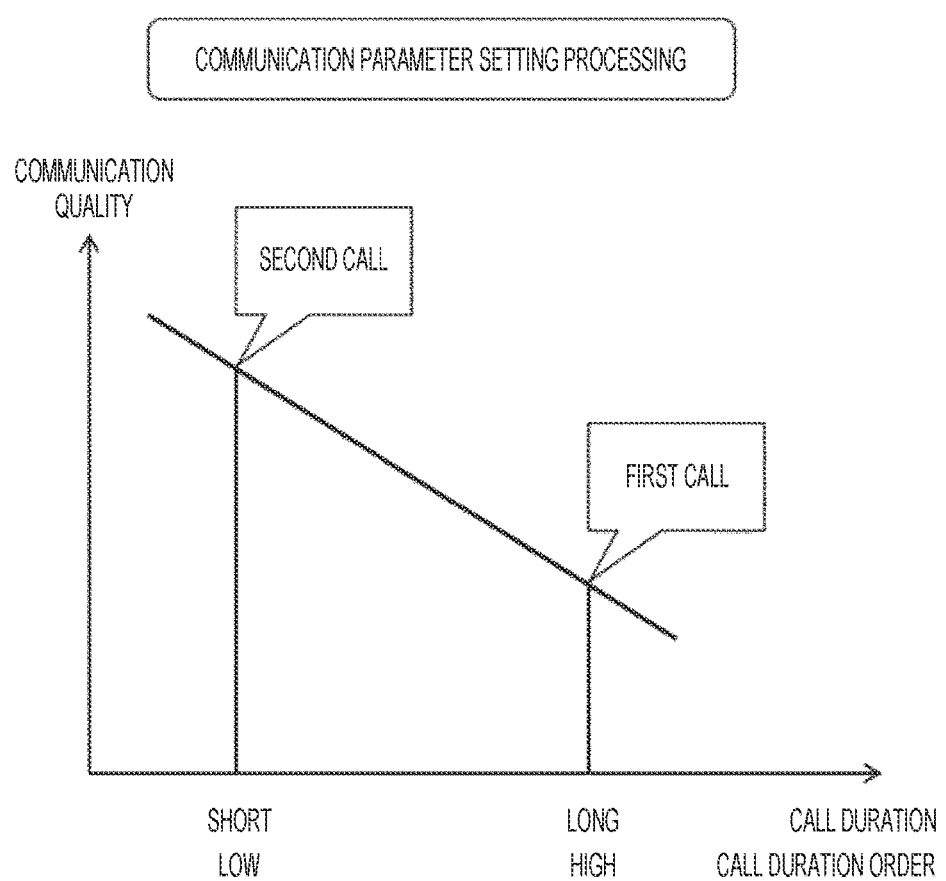
FIG. 5 is a conceptual diagram for describing communication parameter setting processing according to the embodiment of the present invention.

FIG. 5 is a conceptual diagram for describing the communication parameter setting processing according to the present embodiment. The congestion control device 100 sets the communication parameters CP, that is, the communication quality related to the respective calls on the basis of the call duration (call duration orders) of the respective calls. For example, the congestion control device 100 sets the communication parameters CP related to the respective calls such that the communication quality is deteriorated as the call duration is longer. Here, as the call duration is longer, the communication quality may monotonously decrease or may decrease stepwise. Generalization is as follows. A "first call" and a "second call" having different call duration are considered. The call duration of the first call is longer than the call duration of the second call. In this case, the congestion control device 100 sets the communication parameters CP for the first call and the second call such that the communication quality of the first call is worse than the communication quality of the second call.

Figure 6:
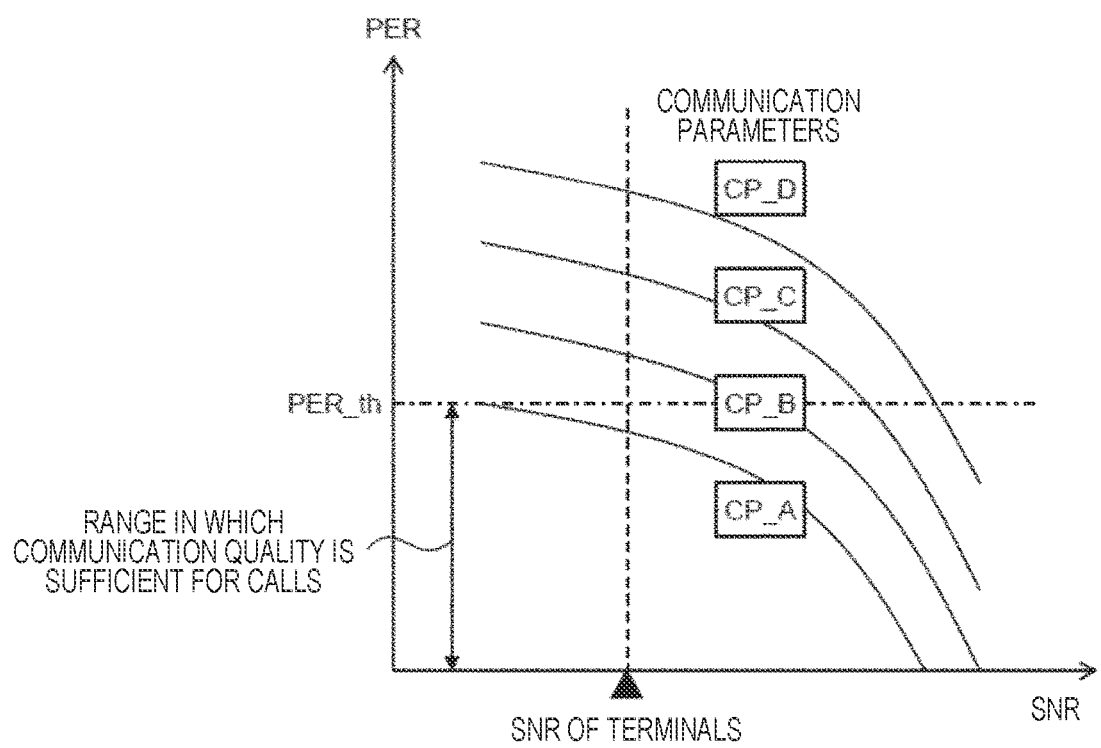
FIG. 6 is a conceptual diagram for describing an example of the communication parameter setting processing according to the embodiment of the present invention.

FIG. 6 is a conceptual diagram for describing an example of the communication parameter setting processing. FIG. 6 illustrates relation between a signal to noise (SN) ratio and a packet error rate in each case of four different communication parameters CP_A to CP_D. For example, the communication parameters CP are modulation methods. The packet error rates decrease and the communication quality increases in the order of the communication parameters CP_A, CP_B, CP_C, and CP_D. In a case where the packet error rates are equal to or less than the threshold value PER_th, communication quality sufficient for calls can be obtained.

For example, a case where the number of simultaneous calls Nsc is four is considered. In this case, for example, a communication parameter CP_C is allocated to two calls having long call duration, a communication parameter CP_A is allocated to one call having the shortest call duration, and a communication parameter CP_B is allocated to the rest of one call. As another example, the communication parameters CP_A, CP_B, CP_C, and CP_D may be allocated to the four calls in ascending order of call duration.

As the number of simultaneous calls Nsc increases, the ratios of communication parameters CP with which the communication quality is deteriorated (examples: CP_C and CP_D) may increase.

As described above, according to the present embodiment, the communication quality of a call having short call duration is set to be relatively high, and the communication quality of a call having long call duration is set to be relatively low. For a call having short call duration and high priority, deterioration of communication quality (voice quality) is prevented. That is, unlike the case of the first comparative example illustrated in FIG. 2, uniform deterioration of the communication quality (voice quality) of all calls is prevented. As a result, the satisfaction levels of users are improved as a whole.

When voice quality decreases, a user is expected to feel like ending a call. That is, as call duration is longer, the possibility that a user ends a call is higher. Ending a call having long call duration releases a line resource, and improves voice quality of a call of another user. Furthermore, a call of a new user is easier to be accepted, and a call loss probability is decreased.

In a case where call duration is long, necessary information has highly likely already been transmitted, so that deterioration of voice quality is not necessarily an issue. Rather, the line resource is preferably transferred to a user having short call duration or a new user during congestion. For example, when disaster happens, it is considered that many users want to perform at least safety confirmation. As long as call duration is short, deterioration of voice quality is prevented, and thus important information such as safety confirmation can be satisfactorily conveyed. Thereafter, when the call duration gets long and the voice quality is deteriorated, the call is expected to be ended. As a result, a new user can easily start a call.

2-2. Comparison with Second Comparative Example

Figure 7:
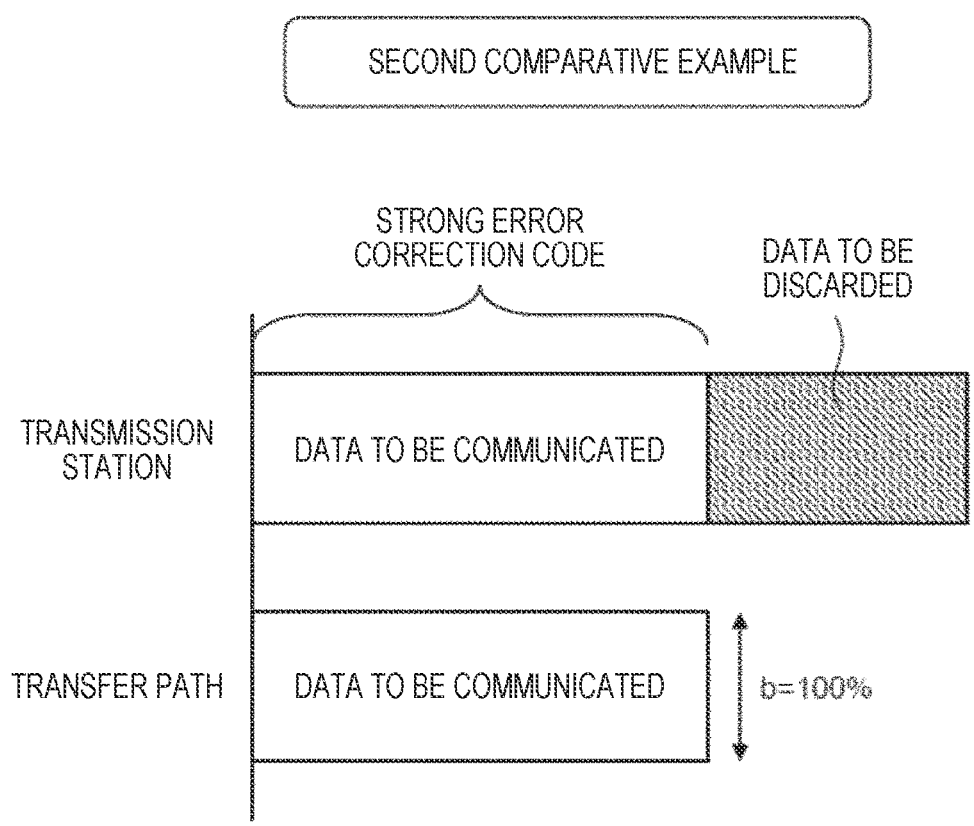
FIG. 7 is a conceptual diagram for describing a second comparative example.

FIG. 7 is a conceptual diagram for describing a second comparative example. According to the second comparative example, when congestion occurs, a part of data is actively discarded before data transmission. On the other hand, data is required to be transmitted without an error in a transfer path. That is, a normal transfer probability b=100% is required. In order to satisfy such requirements, in the second comparative example, a strong error correction code is applied to communication data that has not been discarded. Even in a call having low priority, a strong error correction code is applied to communication data that has not been discarded. Therefore, many communication resources need to be used. Furthermore, it is inconsistent to strictly restrict errors of other data even though some data is discarded. That is, in the case of the second comparative example, use of communication resources is inefficient.

Figure 8:
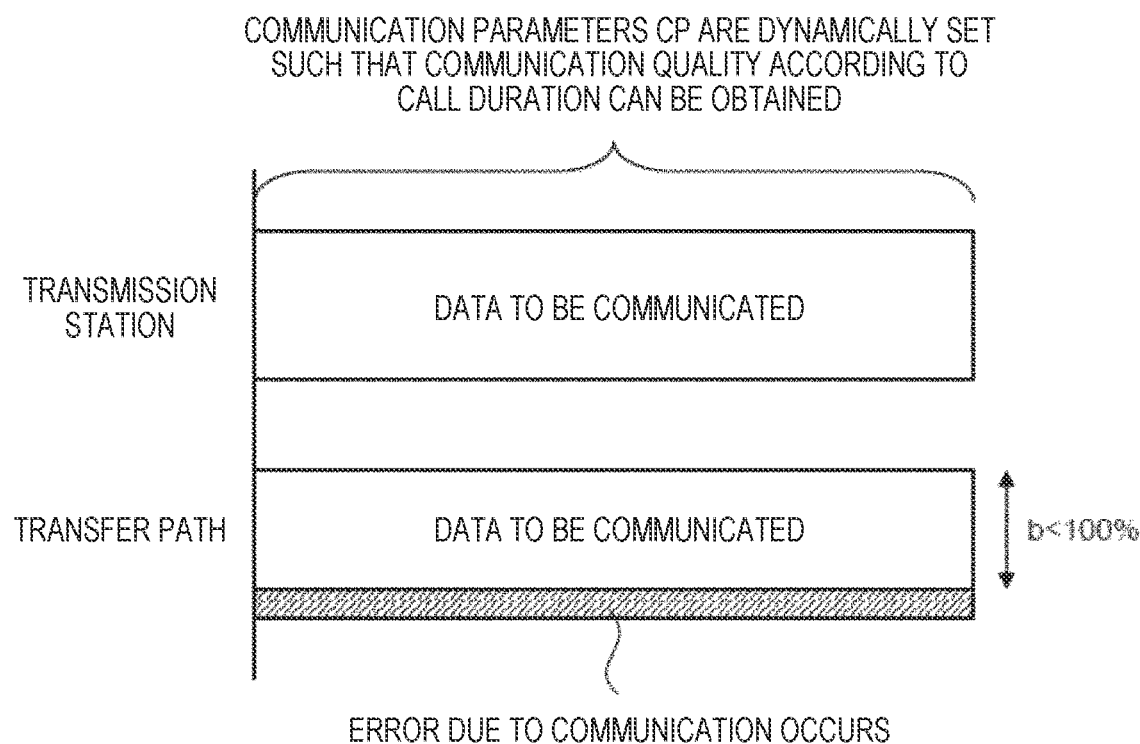
FIG. 8 is a conceptual diagram for describing the communication parameter setting processing according to the embodiment of the present invention.

FIG. 8 is a conceptual diagram for describing the present embodiment. According to the present embodiment, the data discard as in the second comparative example is not performed. Furthermore, the normal transfer probability b is allowed to be less than 100%. Then, the communication parameters CP are dynamically set such that the communication quality according to the call duration can be obtained. As a result, an error is prevented for a call having short call duration, but an error may occur for a call having long call duration. However, there is no issue in that the communication quality of a call having long call duration is deteriorated due to the above reason. According to the present embodiment, since a data error is not unnecessarily strictly restricted, inefficient use of communication resources is prevented.

2-3. Processing Flow

Figure 9:
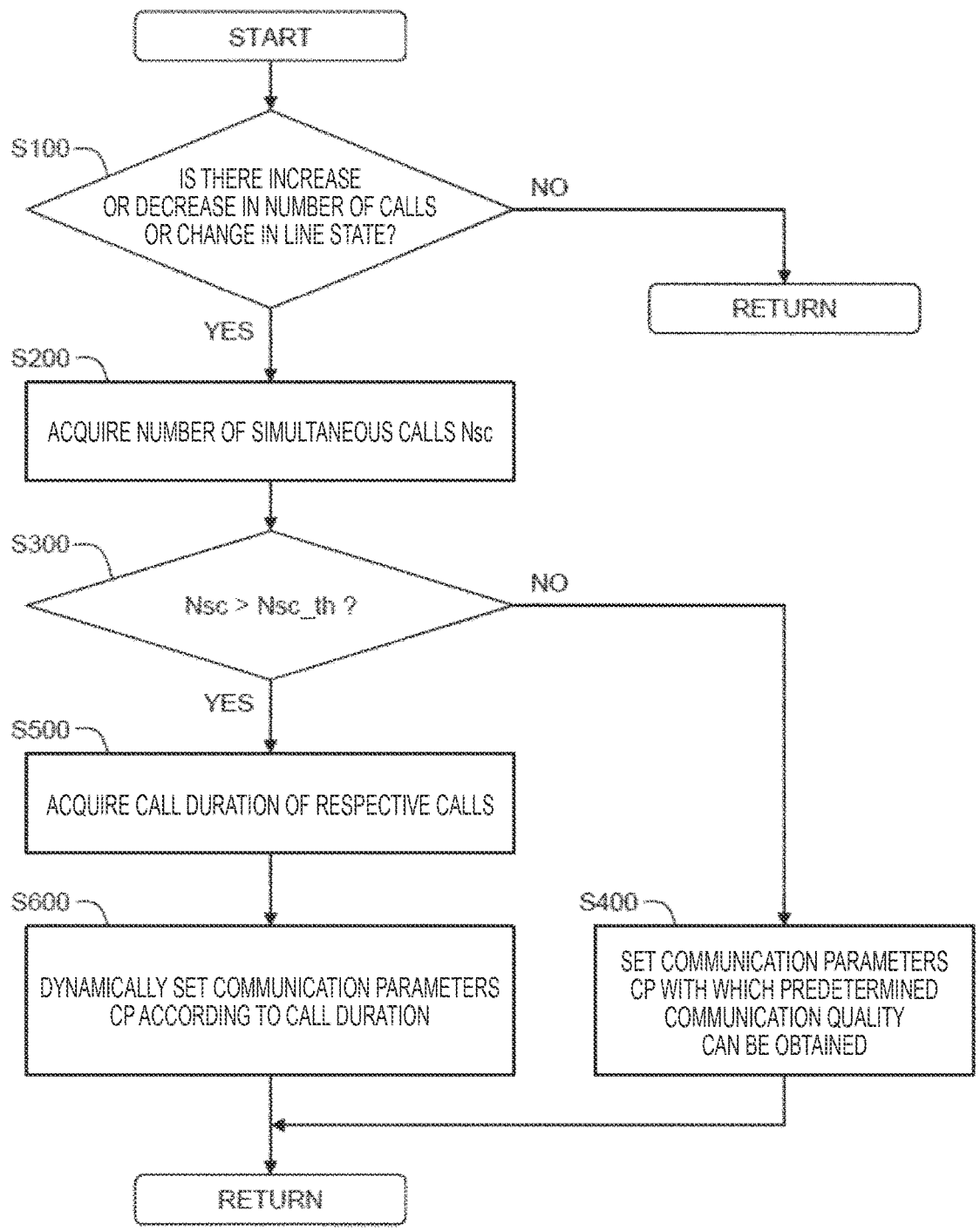
FIG. 9 is a flowchart schematically illustrating processing by a congestion control device according to the embodiment of the present invention.

FIG. 9 is a flowchart schematically illustrating processing by a congestion control device 100 according to the present embodiment.

In step S100, the congestion control device 100 determines whether there is an increase or decrease in the number of calls or a change in the line state. The increase or decrease in the number of calls and the change in the line state may be detected by a base station 10 or may be detected by a terminal station 20. In a case where the information is detected in one of the base station 10 and the terminal station 20, the information may be notified to the other of the base station 10 and the terminal station 20. In a case where there is an increase or decrease in the number of calls or a change in the line state (step S100; Yes), the processing proceeds to step S200.

In step S200, the congestion control device 100 acquires the number of simultaneous calls Nsc.

In subsequent step S300, the congestion control device 100 determines whether the number of simultaneous calls Nsc exceeds a threshold value Nsc_th. The threshold value Nsc_th is the number of simultaneous calls Nsc with which at least predetermined communication quality can be obtained in all calls. For example, the threshold value Nsc_th is the maximum number of simultaneous calls Nsc at which the packet discard ratio expressed by above Equation (1) is 0 or less. In other words, the threshold value Nsc_th is a maximum integer that does not exceed "line capacity/one-call traffic". In this case, when the line state (line capacity) changes, the threshold value Nsc_th also changes. As another example, the threshold value Nsc_th may be a predetermined constant number.

In a case where the number of simultaneous calls Nsc is equal to or smaller than the threshold value Nsc_th (step S300; No), the processing proceeds to step S400. In step S400, the congestion control device 100 does not change the communication parameters CP related to respective calls from the default setting. The communication parameters CP set by default are communication parameters CP with which predetermined communication quality can be obtained.

On the other hand, in a case where the number of simultaneous calls Nsc exceeds the threshold value Nsc_th (step S300; Yes), the processing proceeds to step S500. In step S500, the congestion control device 100 acquires call duration (call duration orders) of the respective calls. Thereafter, the processing proceeds to step S600.

In step S600, the congestion control device 100 sets the communication parameters CP related to the respective calls at least on the basis of the call duration of the respective calls. More specifically, in a case where the call duration of the first call is longer than the call duration of the second call, the congestion control device 100 sets the communication parameters CP such that the communication quality of the first call is worse than the communication quality of the second call (see FIG. 5). For example, the congestion control device 100 sets the communication parameters CP related to the respective calls such that the communication quality is deteriorated as the call duration is longer. As the number of simultaneous calls Nsc increases, the ratios of communication parameters CP with which the communication quality is deteriorated may increase.

2-4. Configuration Example of Congestion Control Device

Figure 10:
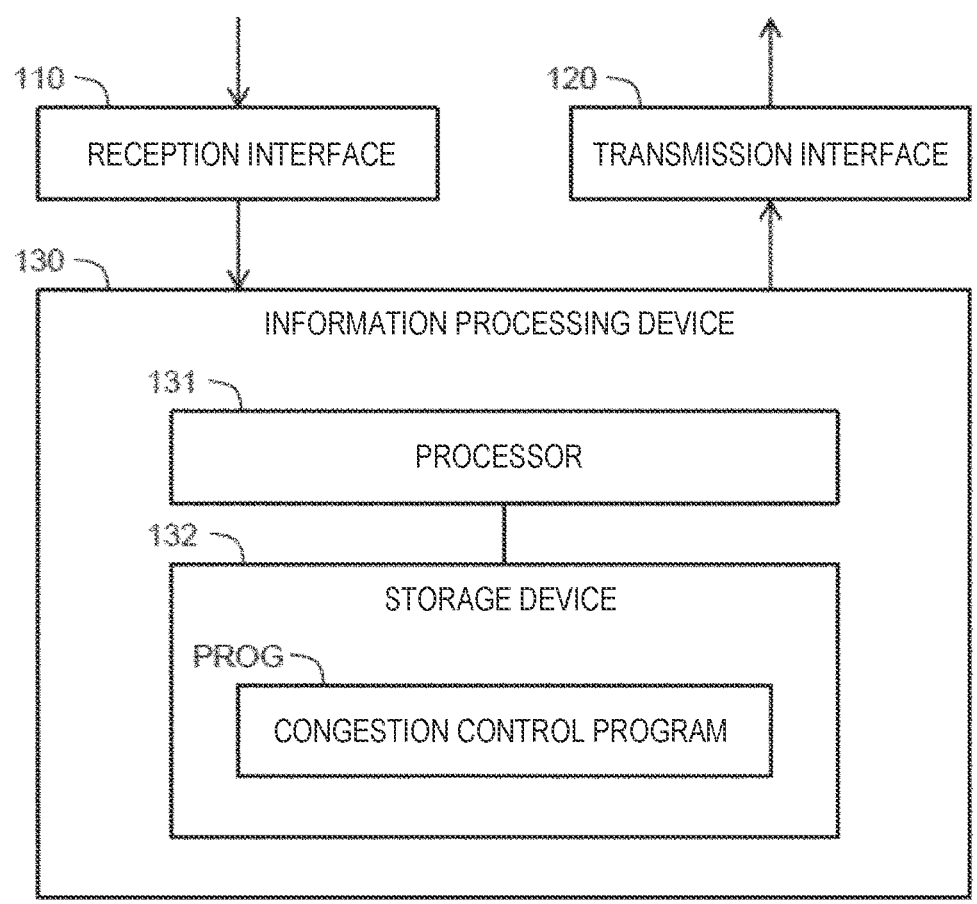
FIG. 10 is a block diagram illustrating a configuration example of the congestion control device according to the embodiment of the present invention.

FIG. 10 is a block diagram illustrating a configuration example of a congestion control device 100 according to the present embodiment. The congestion control device 100 includes a reception interface 110, a transmission interface 120, and an information processing device 130. The reception interface 110 receives packets from the outside. The transmission interface 120 transmits packets to the outside.

The information processing device 130 performs various types of information processing. For example, the information processing device 130 includes a processor 131 and a storage device 132. The processor 131 performs various types of information processing. For example, the processor 131 includes a central processing unit (CPU). The storage device 132 stores various types of information necessary for processing by the processor 131. Examples of the storage device 132 include a volatile memory, nonvolatile memory, hard disk drive (HDD), and solid state drive (SSD).

A congestion control program PROG is a computer program performed by a computer. The function of the information processing device 130 is implemented by the processor 131 performing the congestion control program PROG. The congestion control program PROG is stored in the storage device 132. The congestion control program PROG may be recorded in a computer-readable recording medium. The congestion control program PROG may be provided via a network.

The information processing device 130 may be implemented with the use of hardware such as an application specific integrated circuit (ASIC), a programmable logic device (PLD), or a field programmable gate array (FPGA).

Figure 11:
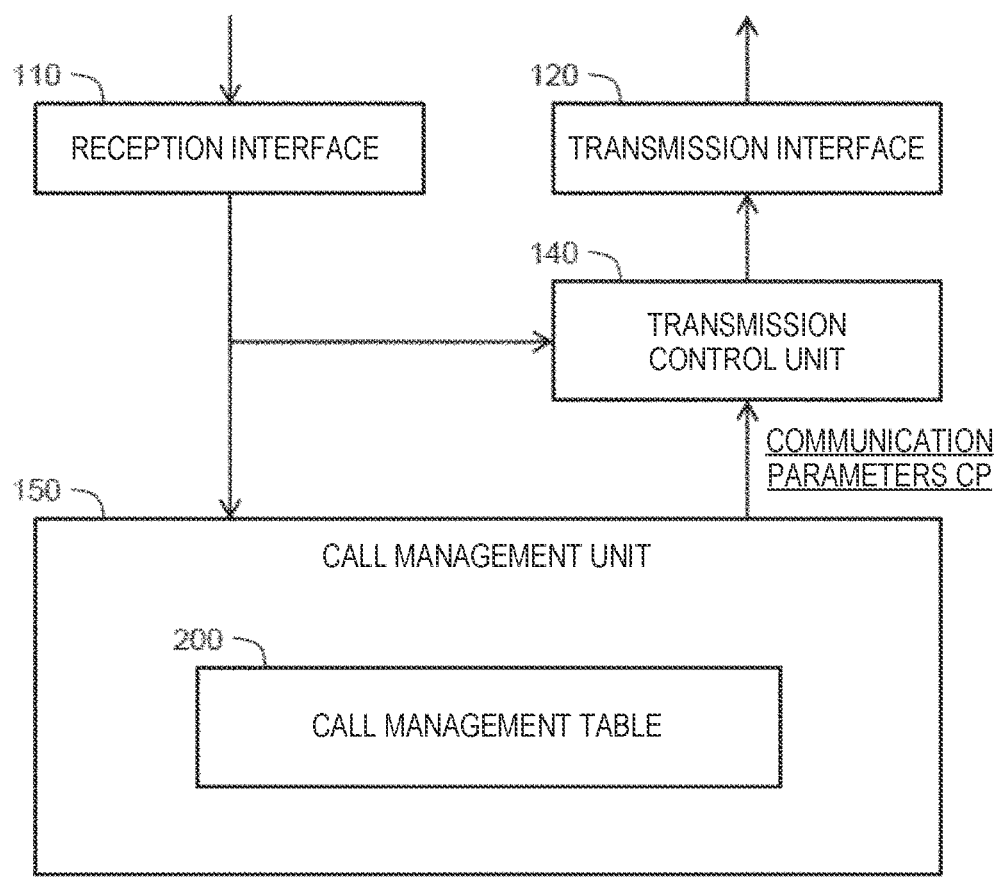
FIG. 11 is a block diagram illustrating a functional configuration example of the congestion control device according to the embodiment of the present invention.

FIG. 11 is a block diagram illustrating a functional configuration example of the congestion control device 100. The information processing device 130 includes a transmission control unit 140 and a call management unit 150. The transmission control unit 140 receives received packets from the reception interface 110. Then, the transmission control unit 140 transmits the received packets as transmission packets via the transmission interface 120. At this time, the transmission control unit 140 generates data in accordance with the communication parameters CP (modulation method and error correction code) and performs transmission processing. The communication parameters CP are set by the call management unit 150.

The call management unit 150 manages each call handled by the congestion control device 100. Each call is defined by a combination of a transmission source address, a transmission source port number, a destination address, and a destination port number.

More specifically, the call management unit 150 receives received packets from the reception interface 110. The call management unit 150 analyzes the received packets and acquires information related to the received packets. Specifically, the call management unit 150 acquires the transmission source address, the source transmission port number, the destination address, and the destination port number of the received packets. Furthermore, the call management unit 150 determines whether the received packets are for any of start call, end call, or other. The analysis result information indicates a transmission source address, a transmission source port number, a destination address, a destination port number, and a classification (start call, end call, or other). The call management unit 150 generates and updates a call management table 200 on the basis of the analysis result information.

FIG. 12 is a conceptual diagram illustrating an example of the call management table 200. The call management table 200 includes entries for respective calls. Each of the entries includes a call ID, a transmission source address, a transmission source port number, a destination address, a destination port number, and call start time.

In a case where the classification of the received packets is "start call", the call management unit 150 creates an entry related to a new call. A combination of the transmission source address, the transmission source port number, the destination address, and the destination port number related to the new call is obtained from the analysis result information. The call management unit 150 assigns a call ID to the new call. Furthermore, the call management unit 150 registers the current time as call start time of the new call.

In a case where the classification of the received packets is "end call", the call management unit 150 deletes an entry related to the call.

The call management unit 150 can acquire the number of simultaneous calls Nsc and the call duration (call duration orders) of respective calls by referring to the call management table 200. The call duration can be calculated from the current time and the call start time. The call management unit 150 performs communication parameter setting processing of setting the communication parameters CP related to the respective calls on the basis of the number of simultaneous calls Nsc and the call duration of the respective calls (see FIG. 9). Then, the call management unit 150 notifies the transmission control unit 140 of the communication parameters CP related to the respective calls.

3. Summary

As described above, according to the present embodiment, a congestion control method in the IP telephone system 1 is provided. The congestion control method includes processing of acquiring the number of simultaneous calls Nsc, processing of acquiring the lengths of call duration of respective calls, and communication parameter setting processing of setting communication parameters CP on the basis of the number of simultaneous calls Nsc and the call duration. In a case where the number of simultaneous calls Nsc exceeds the threshold value Nsc_th, the communication parameters CP are set such that the communication quality of the first call having long call duration is worse than the communication quality of the second call having short call duration.

That is, the communication quality of a call having short call duration is set to be relatively high, and the communication quality of a call having long call duration is set to be relatively low. For a call having short call duration and high priority, deterioration of communication quality (voice quality) is prevented. As a result, uniform deterioration in communication quality (voice quality) of all calls can be prevented. As a result, the satisfaction levels of users are improved as a whole.

When voice quality decreases, a user is expected to feel like ending a call. That is, as call duration is longer, the possibility that a user ends a call is higher. Ending a call having long call duration releases a line resource, and improves voice quality of a call of another user. Furthermore, a call of a new user is easier to be accepted, and a call loss probability is decreased.

In a case where call duration is long, necessary information has highly likely already been transmitted, so that deterioration of voice quality is not necessarily an issue. Rather, the line resource is preferably transferred to a user having short call duration or a new user during congestion. For example, when disaster happens, it is considered that many users want to perform at least safety confirmation. As long as call duration is short, deterioration of voice quality is prevented, and thus important information such as safety confirmation can be satisfactorily conveyed. Thereafter, when the call duration gets long and the voice quality is deteriorated, the call is expected to be ended. As a result, a new user can easily start a call.

REFERENCE SIGNS LIST

1 IP telephone system
2 Ground network
3 Inter-station line
4 Communication network
5 Terminal station network
10 Base station
20 Terminal station
100 Congestion control device
110 Reception interface
120 Transmission interface
130 Information processing device
131 Processor
132 Storage device
140 Transmission control unit
150 Call management unit
200 Call management table
CP Communication parameter
PROG Congestion control program

The invention claimed is:

1. A congestion control method in an Internet protocol (IP) telephone system, comprising:
acquiring a number of established simultaneous calls on a first line shared by a plurality of IP telephones;
acquiring lengths of call duration of respective calls among the established simultaneous calls; and
setting communication parameters that (i) contribute to communication quality of the respective calls among the established simultaneous calls and (ii) are different from a packet discard ratio based on the number of established simultaneous calls and the lengths of call duration,
wherein the call duration of a first established call among the established simultaneous calls is longer than the call duration of a second established call among the established simultaneous calls, and
wherein setting the communication parameters comprises setting the communication parameters such that the communication quality is deteriorated more as the length of the call duration increases based on the number of simultaneous established calls exceeding a threshold value, including setting the communication parameters of the first established call having the longer duration than the second established call such that a first value indicating the communication quality of the first established call is more deteriorated than the communication quality of the second established call as indicated by a second value.

2. The congestion control method according to claim 1, wherein the communication parameters comprise a modulation method.

3. The congestion control method according to claim 1, wherein the communication parameters comprise an error correction code.

4. A non-transitory computer recording medium storing a congestion control program, wherein execution of the congestion control program causes one or more computers to perform operations comprising:
acquiring a number of established simultaneous calls on a first line shared by a plurality of IP telephones;
acquiring lengths of call duration of respective calls among the established simultaneous calls; and
setting communication parameters that (i) contribute to communication quality of the respective calls among the established simultaneous calls and (ii) are different from a packet discard ratio based on the number of established simultaneous calls and the lengths of call duration,
wherein the call duration of a first established call among the established simultaneous calls is longer than the call duration of a second established call among the established simultaneous calls, and
wherein setting the communication parameters comprises setting the communication parameters such that the communication quality is deteriorated more as the length of the call duration increases based on the number of simultaneous established calls exceeding a threshold value, including setting the communication parameters of the first established call having the longer duration than the second established call such that a first value indicating the communication quality of the first established call is more deteriorated than the communication quality of the second established call as indicated by a second value.

5. A congestion control device in an Internet protocol (IP) telephone system, comprising:
an information processing device, implemented using one or more computing devices, and configured to perform:
acquiring a number of established simultaneous calls on a first line shared by a plurality of IP telephones;
acquiring lengths of call duration of respective calls among the established simultaneous calls; and
setting communication parameters that (i) contribute to communication quality of the respective calls among the established simultaneous calls and (ii) are different from a packet discard ratio based on the number of established simultaneous calls and the lengths of call duration, wherein the call duration of a first established call among the established simultaneous calls is longer than the call duration of a second established call among the established simultaneous calls, and wherein setting the communication parameters comprises setting the communication parameters such that the communication quality is deteriorated more as the length of the call duration increases based on the number of simultaneous established calls exceeding a threshold value, including setting the communication parameters of the first established call having the longer duration than the second established call such that a first value indicating the communication quality of the first established call is more deteriorated than the communication quality of the second established call as indicated by a second value.

6. The congestion control device according to claim 5, wherein the communication parameters comprise a modulation method.

7. The congestion control device according to claim 5, wherein the communication parameters comprise an error correction code.

* * * * *